March 3, 1959

W. H. ENGELHARDT ET AL 2,875,608

DEEP DRAWING TESTING APPARATUS

Filed Feb. 16, 1955

INVENTORS
WERNER H. ENGELHARDT
HORST E. GROSS
BY

ATTORNEY

March 3, 1959

W. H. ENGELHARDT ET AL 2,875,608

DEEP DRAWING TESTING APPARATUS

Filed Feb. 16, 1955

INVENTORS
WERNER H. ENGELHARDT
HORST E. GROSS
BY

ATTORNEY

United States Patent Office 2,875,608
Patented Mar. 3, 1959

2,875,608

DEEP DRAWING TESTING APPARATUS

Werner H. Engelhardt and Horst E. Gross, Zwickau, Germany, assignors to Forschungsinstitut fur bildsame Formung der Metalle, Zwickau, Germany Application February 16, 1955, Serial No. 488,627

14 Claims. (Cl. 73—87)

Among the hitherto common methods for testing the deep drawing capacity are some which are very simple and can be carried out without any considerable cost. Of these the bulging or denting processes are the most well known and used ones. In these denting processes the sheet to be tested is subjected to the action of a cupping punch. However, in these processes the sheet metal is not deformed in the same way as by deep drawing, for in deep drawing processes, some material flows over the edge of the die during deformation. In the denting processes, however, the deformation occurs merely by a decrease of the thickness of the material. Therefore another kind of stressing is tested than actually occurs during deep drawing.

Those test methods, however, which approach the actual conditions during deep drawing, are either too complicated, because they require a graphical solution, or too expensive, because they require long testing times, or are connected with a too high consumption of material.

In literature it has been pointed out, that the deep drawing capability depends on the relation between the maximum of the "needed" and the "transmissible" force. The needed force is understood to be the force necessary for the deformation of the sheet metal between the holder of the blank or specimen and the annular die and for bending at the drawing edge of the die. The transmissible force is understood to be the maximal force, which can be "transmitted" from the bottom of the developing hollow body across the wall of the hollow body to the place of its consumption, that is the drawing edge and the space between the blankholder and the annular die. The peculiarity of deep drawing is, that the force necessary for the deformation is not originally applied to the cross-section proper, where it is needed, but that it is applied by the punch to the bottom of the developing hollow body and must be transmitted from there through the wall of the hollow body to the place of its consumption.

In literature the relations between the needed and the transmissible force have been illustrated in the graph of Figure 1, in which as measure for both the forces the corresponding stresses are plotted as ordinate and the drawing depth as abscissa. The stress $\delta$ necessary for the deformation is equal to the product of the average resistance to deformation $k_{f_m}$ of the metal to be deformed and the natural logarithm of the form change F, so that the following equation is obtained:

$$\delta = k_{f_m} \cdot \ln F$$

The form change in turn is designated as the quotient of the measurement A prior to the deformation and the measurement E after the deformation, so that above equation can be written as $$\delta = k_{f_m} \cdot \ln \frac{A}{E}$$

In the present case, the measurement A prior to deformation is designated by the diameter D of the blank or round, while the measurement E after deformation is indicated by the diameter $d$ of the hollow cup-shaped body obtained. The stress $\delta'_r$ which is necessary for the deformation in question is thus $$\delta'_r = k_{f_m} \cdot \ln \frac{D}{d}$$

The quotient obtained by the diameter $d$ of the cup and the diameter D of the round prior to deformation is also designated as the drawing ratio $z$, thus $$z = \frac{d}{D}$$

Accordingly, the stress $\delta'_r$ required for the deformation by deep drawing can be written as follows:

$$\delta'_r = k_{f_m} \cdot \ln \frac{1}{z}$$

According to literature the maximum stress which can be transmitted and absorbed by the wall of the round or blank is proportional to the tensile strength $\delta_B$, which fact may be expressed by indicating the factual magnitude of the maximum stress as $x \cdot \delta_B$. It is independent of the drawing depth or path.

The difference between the transportable stress $x \cdot \delta_B$ and the maximum stress $\delta'_{r_{max}}$ needed, or the stress corresponding to any force is a measure for the deep drawing capacity T of a material. If the difference is large, the deformation to a hollow body is guaranteed. If the difference is small, only a little irregularity is necessary to disturb the process. If the difference is zero or negative, deep drawing is impossible for the bottom of the cup tears off as soon as the needed force reaches the magnitude of the transmissible force.

With a view to making the thus defined measure T of the deep drawing capacity applicable for practical purposes, it has to be made comparable.

The so defined measure of the deep drawing capacity becomes comparable, when all conventionally adjustable dimensions, i. e. the diameter of the rounds used for testing, the pressure of the blankholder and the drawing edge are chosen always in the same manner, as this is usually done in cupping tests.

Finally the difference of stresses and forces respectively should be given as proportional number or ratio, as this is done in the calculation of breaking stresses such as the ultimate elongation or contraction. The following relation arises $$T = \frac{x\delta_B - \delta'_{r_{max}}}{x \cdot \delta_B} \cdot 100\%$$

In view of the fact that it is preferred for practical purposes to count with forces actually occurring, instead of with stresses, the equation is preferably rewritten as applying to these forces. $P_{ab}$ is thus used to indicate the transmissible force, while $P_{max}$ indicates the maximum force required. The equation is then written in the following manner $$T = \frac{T_{ab} - P_{max}}{P_{ab}} \cdot 100\%$$

The value for the deep drawing capacity thus obtained corresponds to factual conditions during the deep drawing and thus stands for a true value which actually reflects the deep drawing capacity of the material to be tested.

In accordance with this invention, the value T for the deep drawing capacity of a given material is ascertained in a particularly simple manner by using an apparatus in the form of a cupping device, as is already known for the reliable determination of the drawing ratio of materials. In accordance with the invention, such cupping device is fitted with a holding means which holding means prevents the material during drawing to be drawn into the drawing space after a predetermined, adjustable drawing depth or path has been traveled through.

In using a testing apparatus in form of cupping devices, $P_{ab}$ can be ascertained as the force necessary to tear off the bottom of the cup at the termination of the drawing process. $P_{max}$ is naturally measurable as the extreme drawing force practiced by the punch.

In order to suit the necessities of practice it is important that according to the above formula the needed values of $P_{ab}$ and $P_{max}$ for finding the deep drawing capability T can be ascertained in a very simple and time saving manner. Therefore the subject matter of the invention represents a deep drawing testing apparatus of the cup-drawing type, which according to the present invention is equipped with a clamping means or member co-operative with an annular die to clamp the material of a specimen or blank to be tested against a zone of the die intermediate a marginal holder of the specimen and a punch. The clamping means can be designed in different ways: For instance it may consist of a ring, that is guided in the blankholder, or it may contain pins, which engage through recesses of the blankholder. It also may be designed as a bush guided by the punch or as a strengthening of the punch or similar. The face of the clamping means turned towards the material may be shaped complementary to the profile of the annular die in the zone where the pressure is applied, and may be roughened.

The clamping means connected with the other elements of the deep drawing testing apparatus in such a way, that it is pressed on the material of the specimen by any suitable force or power, and may be so controlled by any suitable means that it begins to act on the material after the punch has drawn the specimen to a predetermined depth which may be adjustable and that it continues to act while the punch thereafter continues its stroke.

Further objects and details of the invention will be apparent from the description given hereinafter and the accompanying drawing illustrating two embodiments thereof by way of example. In the drawing.

Figure 2:
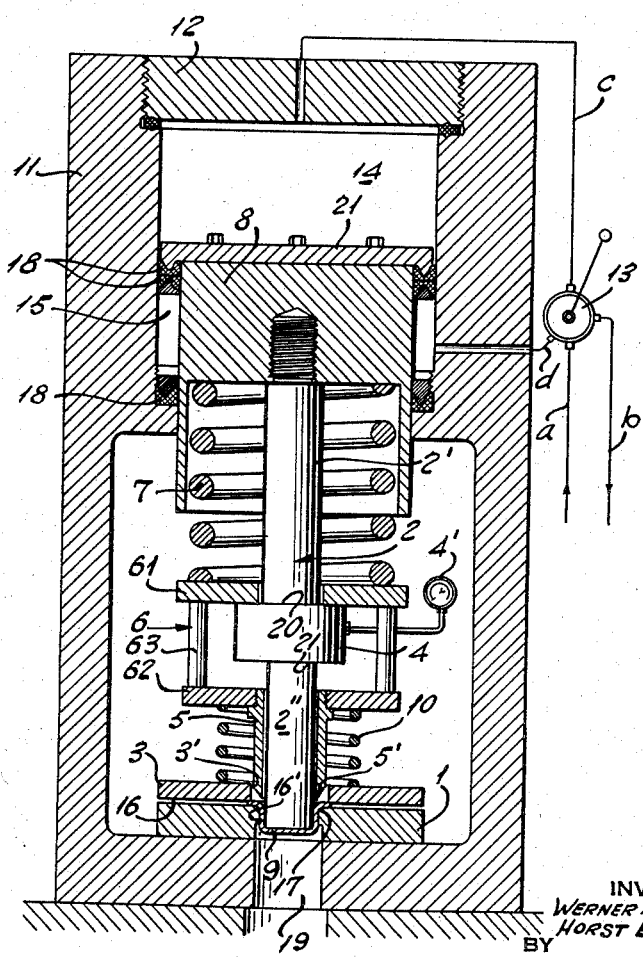
Fig. 2 is a vertical cross-section of an embodiment of the invention in which the deep-drawing process has already started.

Referring now to Fig. 2 of the drawing, reference numeral 11 indicates a frame or support. An annular die 1 is placed on the bottom of the support in such a manner that the bore of the die 1 is substantially coaxial with the bore 19 of the support. The transition between the top surface 16 of the die and the defining wall 16' of its bore defines a drawing edge 17. A round specimen or blank 9 is placed on the drawing ring 1 so that it covers the bore thereof. The outer marginal portion of the specimen 9 is pressed against the top surface of the die 1 by an annular holder 3 having a larger inner contour 3' than the wall 16' of the die 1. Any suitable power may be used in order to reciprocate the punch. In the illustrated embodiment, the punch is hydraulically operated. For this purpose, a piston-shaped punch-head 8 is slidably arranged in a cylindrically shaped space 14 defined by the support 11. The space 14 is closed by a cover 12 screwed into the support 11. Gaskets 18 are provided for tightening the piston-shaped punch-head 8 against the wall of the space 14.

The hydraulic system comprises the control valve 13, a first line $c$ entering the space 14 at the top through the cover 12, a second line $d$, entering the space 14 near the bottom thereof, a third line $a$ and a fourth line $b$. Line $a$ is the supply line for hydraulic liquid and can be connected to either $c$ or $d$ while line $b$ is the return line. By properly adjusting the control valve 13, hydraulic pressure liquid flows through lines $a$ and $c$ into the space 14 from the top, whereby the punch-head 8 is pressed downwardly. When the punch-head 8 is to be moved upwardly again, the valve 13 will be adjusted so that pressure fluid enters the space 15 through lines $a$ and $d$ whereby pressure is exerted on the top member 21 of the punch-head 8 and the latter will move upwardly while the pressure fluid contained in space 14 is discharged through lines $c$ and $b$.

A punch, in general denoted by 2, is screwed into the punch-head 8 and thus follows the movements thereof. Fig. 2 shows the punch after having traveled downwards a relatively short portion of its stroke.

A pressure sensitive device 4 of any known or suitable construction provided with a measuring gauge 4', is rigidly secured to the punch 2 between the upper punch part 2' and the lower part 2''. The device 4 is box-shaped and forms a collar or flange on the punch 2 with an upper surface 20 and a lower surface 21. A frame-like structure, in general denoted by 6 and constituting a part of the aforementioned clamping means comprises upper and lower flanges 61 and 62 axially movable relatively to the punch 2, and the spacers 63 between the flanges 61 and 62. During the downward stroke of the punch, the structure 6 with flange 61 is supported by the top face 20 of the measuring box 4 and pressed thereagainst by a spring 7 interposed between the top face of the structure 6 and the bottom face of the punch head 8. For a purpose to be explained later on, the spacing between the flanges 61 and 62 is greater than the vertical thickness of the pressure box 4 which is located intermediate the flanges. A further spring 10 is interposed between the bottom face of flange 62 of the structure 6 and the holder 3, said spring 10 urging the holder 3 against the margin of the specimen or blank 9, whereby the latter is securely held between the holder 3 and the die 1.

The clamping means further comprises a sleeve or bushing 5 which is screwed into the bottom flange 62 of the structure 6 and coaxially surrounds the punch 2. The free end face 5' of the sleeve or bushing 5 is shaped substantially complementary to the edge 17 of the die 1 and may be roughened as indicated in Fig. 2. In the position of Fig. 2, the tapering lower end of the bushing 5 is a predetermined distance above the lower end of the punch 2. This distance may be adjusted by either altering the length of the spacers 63 of the structure 6 or by screwing the bushing 5 deeper or less deep into the bottom flange 62. It will be seen that the outer diameter of the bushing 5 is slightly smaller than the diameter of the bore of the holder 3, while the inner diameter of the bushing 5 is substantially similar to the diameter of the bore of the die 1.

The operation of the inventive testing device is as follows:

The round blank or specimen 9 is first placed on the top surface 16 of the drawing ring 1 whereafter the holder 3 is put in position so that the outer marginal portion of the blank 9 is securely held between the holder 3 and the die 1. Pressure liquid is now introduced into the space 14 through lines $a$ and $c$ whereby the punch-head 8 and with it the punch 2 are moved downwardly. The punch 2 thus is pressed against the top face of the specimen 9 and when the downward movement of the punch continues the body portion of the specimen 9 is drawn by the punch 2 into the bore of the die about the drawing edge 17 while the outer marginal portion of the specimen 9 is securely held between the holder 3 and the die 1. The specimen 9 is thus deformed into a cup-shaped body. This is shown in Fig. 2. Since the structure 6 is under the pressure of the spring 7, this structure follows the downward movement of the punch-head 8 with its punch 2. The bushing 5, screwed into the structure 6, is thus likewise moved downwardly until its end face 5 bears on the inner marginal portion of the specimen. From then on, the bushing 5 acts as a presser member to clamp the specimen fast to the drawing edge thus preventing, upon the continuation of the punch stroke, the further flow of the material of the specimen 9 over the edge 17 into the space defined by the punch 2 and the wall of the bore of the die.

Figure 1:
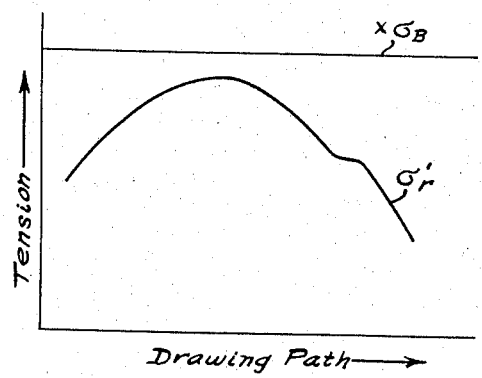
Fig. 1 is a diagram of stresses as mentioned hereinbefore.

The drawing of the specimen 9 by the punch 2 results in an increase of the drawing force and with it of the drawing stress or tension in such a manner as can be seen by the graph $\delta'_r$ of Fig. 1. The graph passes through a maximum and then drops again to a lower value. By reading the gauge 4' of the measuring device, the maximum drawing force, which thus corresponds to the force $P_{max}$, can be readily ascertained.

The sleeve or bushing 5 is adjusted in such a manner that it comes to bear against the inner marginal portion of the specimen 9 after the maximum of the drawing force or stress has been sufficiently passed. The sleeve or bushing 5 then presses the specimen against the die so that no more flowing or drawing of the specimen material into the bore of the die 1, in the space between the punch and the wall of the bore can occur. While thus the inner marginal portion of the specimen is firmly held to the edge 17 of the die, the punch 2 continues to move downwardly. Consequently, the transmissible force increases. As soon as the transmissible force has reached the value of the tearing force $P_{ab}$, i. e., as soon as the tearing stress $x \cdot \delta'_B$ is reached the bottom of the cup-shaped body tears off and the forces or tensions drop to zero value.

The value of $P_{ab}$ is again read on the gauge 4' of the measuring device. The calculation of the value T is now easily effected by means of the previously given formula $$T = \frac{P_{ab} - P_{max}}{P_{ab}} \cdot 100\%$$

Pressure liquid is now introduced through lines $a$ and $d$ whereby the punch-head 8 with its punch 2 is moved upwardly again and the device is ready for a further test.

Figure 3:
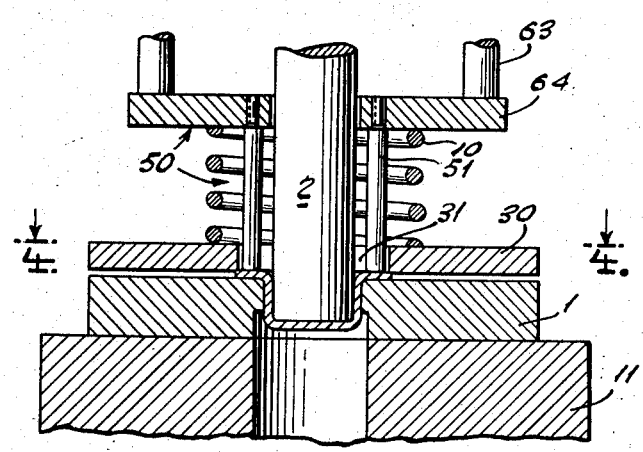
Fig. 3 is a partial section of a modification.
Figure 4:
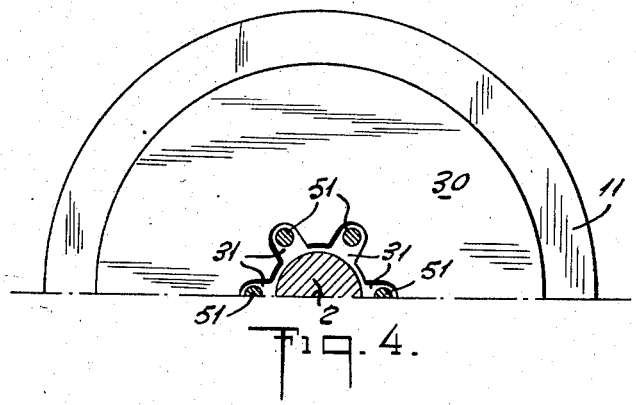
Fig. 4 is a cross-section along line 4—4 in Fig. 3.

Figs. 3 and 4 illustrate an embodiment in which the clamping means 50 comprises a plurality of individual rods or pins 51 surrounding the punch 2 rather than a sleeve or bushing 5. The arrangement of the rods is clearly apparent from Fig. 4. The specimen-holder 30 is provided with as many radially extending recesses 31 as there are rods 51 which are in registry with the recesses, respectively. The distance between the lower ends of the rods 51 and the lower end of the punch 2 may be altered by changing the screwing position of the rods in the bottom flange 64 to which the spacers 63 are secured. In all other respects, the embodiment of Figs. 3 and 4 is similar to that of Fig. 2.

It will be apparent to those skilled in the art that many alterations and modifications of the structure shown and hereinbefore described can be made without departure from the essence and spirit of the invention which for that reason shall not be limited but by the scope of the appended claims.

We claim:

1. In a deep-drawing testing device of the cup-drawing type, the combination of an axially reciprocable punch, a hollow die coaxial and cooperative with said punch and having a substantially flat surface on the side from which said punch can enter said die, an annular holder adapted to hold a sheet metal specimen to be tested on said flat die surface, said holder having an inner contour larger than the inner contour of said die, a clamping means surrounding said punch and being operative to press said specimen on said die intermediate the punch circumference and said inner holder contour, means to operate said punch, means to operate said clamping means, power transmitting means connecting said clamping means to said punch so as to cause said clamping means to exert pressure on said specimen when said punch has performed a predetermined part length of its stroke and during the remainder of the punch stroke, and means for measuring the operating force exerted on said punch during its stroke.

2. A testing device as in claim 1, said power transmitting means being adjustable, thereby to vary said predetermined part length of said punch stroke.

3. In a deep-drawing testing device of the cup-drawing type, the combination of an axially reciprocable punch having an active end face, a hollow die coaxial and cooperative with said punch and having a substantially flat surface on the side from which said punch can enter said die, a holder coaxial with said die and adapted to hold a sheet metal specimen to be tested on said flat die surface, said holder having an inner contour larger at least in part than the inner contour of said die, a clamping means surrounding said punch and having an end portion with an end face set back axially a predetermined distance from said end face of said punch when both said punch and said clamping means are in inoperative positions, said clamping means being adapted to enter with its end portion into the space between said holder and said punch, means to operate said punch, power transmitting means connecting said clamping means to said punch so that said clamping means will bear on said specimen intermediate said punch and said holder when said punch has drawn said specimen as deep as said predetermined distance and will be pressed by said power transmitting means on said specimen during the continuation of the operative stroke of said punch, and means for measuring the operating force exerted on said punch during its stroke.

4. A device as in claim 3, said clamping means including means for adjusting said predetermined distance between the end face of said clamping means and said end face of said punch.

5. A device as in claim 3 wherein said power-transmitting means includes a compression spring and said punch is axially shiftable in relation to said clamping means whereby the clamping force increases during said continuation of said punch stroke.

6. A device as in claim 3, wherein said power-transmitting means includes a compression spring, further comprising means for adjusting the total length of said clamping means between said end face thereof and said spring thereby to vary said predetermined distance.

7. A device as in claim 3 wherein said power-transmitting means is a compression spring under pre-tension, and an abutment is provided between said punch and said clamping means to define said predetermined distance during an initial portion of the punch stroke.

8. A device as in claim 3 further comprising first abutment means between said punch and said clamping means to define said predetermined distance as a minimum distance between said ends of said punch and said clamping means, and second abutment means between said punch and said clamping means and defining the total length of the punch stroke.

9. A device as in claim 3, said measuring means including a pressure sensitive organ coaxially secured between two portions of said punch.

10. A device as in claim 3, said end face of said clamping means being roughened.

11. A device as in claim 3, said end face of said clamping means being shaped substantially complementary to the shape of the edge zone of said die between said inner contour and said flat surface of said die.

12. A device as in claim 3, said clamping means including a sleeve in which said punch is axially movable, and said sleeve being provided with said end portion with which said sleeve is adapted to enter the space between said holder and said punch.

13. A device as in claim 3, said inner contour of said holding means being provided with a plurality of radially extending recesses, and said clamping means including as many rods as there are recesses, said rods being arranged parallel to and surrounding said punch and being in registry with said recesses, said rods having free ends adapted to engage said recesses and to bear on said specimen.

14. A device as in claim 3, said punch having a head and two shoulders facing the opposite directions, said clamping means including two flanges axially shiftable on said punch, spacers to hold said flanges at a predetermined distance which is larger than that of said two shoulders, and presser means secured to that one of said flanges which faces said punch end, said presser means having said end face to bear on said specimen, and said power-transmitting means including a compression spring between said punch head and said other flange which faces said head, whereby said first mentioned flange bearing on its adjacent shoulder defines said predetermined distance of the end face of said clamping means from said punch end, and said other punch shoulder bearing on said other flange defines the maximum depth of the punch stroke.

References Cited in the file of this patent

UNITED STATES PATENTS

| | | |
|---|---|---|
| 1,371,050 | Olsen | Mar. 8, 1921 |
| 1,653,714 | Lewis | Dec. 27, 1927 |
| 1,892,013 | Siebel | Dec. 27, 1932 |
| 2,262,084 | Alexander | Nov. 11, 1941 |

FOREIGN PATENTS

| | | |
|---|---|---|
| 849,189 | Germany | Sept. 11, 1952 |
| 1,047,130 | France | July 15, 1953 |
| 1,062,308 | France | Dec. 2, 1953 |
| 911,439 | Germany | May 13, 1954 |